US011104849B1

(12) United States Patent
Fauconier

(10) Patent No.: US 11,104,849 B1
(45) Date of Patent: Aug. 31, 2021

(54) METHOD FOR RESTRICTING LASER BEAMS ENTERING AN APERTURE TO A CHOSEN DYAD AND MEASURING THE BEAMS' SEPARATION

(71) Applicant: Richard Fauconier, Andover, MA (US)

(72) Inventor: Richard Fauconier, Andover, MA (US)

(73) Assignee: Richard Fauconier, Andover, MA (US)

( * ) Notice: Subject to any disclaimer, the term of this patent is extended or adjusted under 35 U.S.C. 154(b) by 0 days.

(21) Appl. No.: 17/155,402

(22) Filed: Jan. 22, 2021

Related U.S. Application Data

(63) Continuation-in-part of application No. 16/997,248, filed on Aug. 19, 2020, now abandoned.

(51) Int. Cl.
*C10G 1/00* (2006.01)
*G01N 21/31* (2006.01)
*G01J 3/42* (2006.01)

(52) U.S. Cl.
CPC ............... *C10G 1/008* (2013.01); *G01J 3/42* (2013.01); *G01N 21/31* (2013.01)

(58) Field of Classification Search
None
See application file for complete search history.

(56) References Cited

U.S. PATENT DOCUMENTS

| 6,975,410 | B1* | 12/2005 | Sturgill | G01B 11/06 356/631 |
| 2007/0070357 | A1* | 3/2007 | Aiyer | G01B 11/0675 356/485 |
| 2017/0351185 | A1* | 12/2017 | Qi | G03F 9/7026 |
| 2019/0383599 | A1* | 12/2019 | Gregory | G01N 33/32 |
| 2020/0080931 | A1* | 3/2020 | Fauconier | G01N 21/27 |

OTHER PUBLICATIONS

Fauconier, Richard, Mandoye Ndoye, and Webert Montlouis. "Optical fundamentals of an adaptive substance-on-surface chemical recognizer." Electro-Optical and Infrared Systems: Technology and Applications XIV. vol. 10433. International Society for Optics and Photonics, 2017. (Year: 2017).*
Richard Fauconier, "Feedback control method for limiting interfering Gaussian beams in a bistatic substance-onsurface chemical recognizer", SPIE Security and Defence 2019 Proceedings, vol. 11159, Electro-Optical and Infrared Systems: Technology and Applications XVI, 111590T, Strasbourg, France, Oct. 9, 2019.

* cited by examiner

*Primary Examiner* — Shawn Decenzo

(57) ABSTRACT

One embodiment of a method for restricting laser beams entering an aperture to a chosen dyad and measuring their separation; the method works with frequency-modulated coherent light, and one embodiment uses a moveable, variable-aperture apparatus (FIG. 1) in conjunction with a converging lens (6) and a detector (7); and key elements of other embodiments are also described.

3 Claims, 3 Drawing Sheets

METHOD FOR RESTRICTING LASER BEAMS ENTERING AN APERTURE TO A CHOSEN DYAD AND MEASURING THE BEAMS' SEPARATION

This application claims the benefit of nonprovisional patent application Ser. No. 16/997,248 filed Aug. 18, 2020, by the present inventor.

TECHNICAL FIELD

The invention is in the technical field of reflectance spectroscopy and substance-on-surface identification.

BACKGROUND

In the area of reflectance spectroscopy, interference effects from films of unknown refractive index and thickness cause ambiguities in substance-on-surface identification. This presents a problem not in the laboratory, but in the field, where the thickness of the film to be identified is not controlled, and nothing at all is known about the film to begin with. A complication is that any illuminating beam incident on the film is immediately converted into multiple reflected and refracted beams. An essential first step in identifying the substance is selecting a single dyad from the host of multiply refracted and reflected derivative beams and measuring their separation, not in a controlled laboratory environment, but in the uncontrolled, unforgiving field. This patent application presents a method to accomplish this.

SUMMARY

As exemplified by one embodiment, this invention is a method of using a moveable variable-aperture apparatus and a lens and detector to select a chosen dyad from a multiplicity of parallel coherent, frequency-modulated light beams, and to measure their separation.

In one embodiment, in an aspect, a method of using a moveable, variable-aperture apparatus in conjunction with a lens and a detector to admit only two beams from a multiplicity of parallel beams of frequency-modulated coherent light via the following steps: pre-setting said moveable, variable-aperture apparatus's aperture to the known width of a single beam of light, then positioning said moveable, variable-aperture apparatus until the light which passes its aperture is of maximum intensity and zero beat frequency, then leaving said moveable, variable-aperture apparatus in place but opening the aperture to the minimum width with which the light passing through its aperture attains maximum intensity with non-zero beat frequency, and thus admitting only two beams of light from the multiplicity of parallel beams.

In another embodiment, in an aspect, a method of using a moveable, variable-aperture apparatus to measure the separation between two parallel beams of light, comprising the method of the previously-described embodiment and the measuring q, the width of the aperture upon completion of the method of the previously-described embodiment, then subtracting w, the known beamwidth, from q, the aperture width, to obtain s, the separation of the beams' central axes, using the equation $s=q-w$.

In another embodiment, in an aspect, a method of using a moveable, variable-aperture apparatus to measure an alternative separation between two parallel beams of light, comprising the method described in the embodiment discussed two paragraphs above this paragraph, and then measuring q, the width of the aperture upon completion of said method and subtracting twice the known beamwidth w from the aperture width q, to obtain u, the separation of the beams' outer envelopes, using the equation $u=q-2w$.

DRAWINGS—FIGURES

In the drawings, closely related figures have the same number but different alphabetic suffixes.

DRAWINGS—REFERENCE NUMERALS

Figure 1:
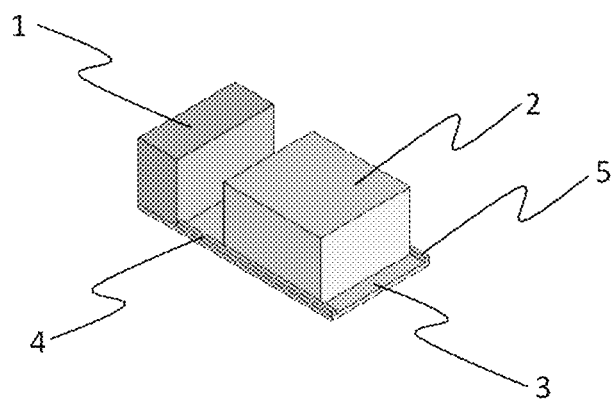
FIG. 1 shows one embodiment of a moveable variable-aperture apparatus ("MVA").

1 Fixed gate of moveable, variable-aperture apparatus
2 Sliding gate of moveable, variable-aperture apparatus
3 Base of moveable, variable-aperture apparatus
4 First guide rail of moveable, variable-aperture apparatus
5 Second guide rail of moveable, variable-aperture apparatus
6 Converging lens
7 Detector, capable of determining the intensity and modulation parameters of incident light.
8 Incident beam of coherent, frequency-modulated light, first of a bundle of 3 parallel beams. The embedded arrow shows its direction.
9 Incident beam of coherent, frequency-modulated light, second of a bundle of 3 parallel beams. The embedded arrow shows its direction.
10 Incident beam of coherent, frequency-modulated light, third of a bundle of 3 parallel beams. The embedded arrow shows its direction.

Detailed Description—FIGS. 1 and 2A Through 2C—First Embodiment

To illustrate the method, an embodiment of the aperture apparatus and accessories that can be used for implementation is described. In the moveable variable-aperture apparatus of FIG. 1, sliding gate 2 can move to and fro along base 3, in order to open or close the aperture between sliding gate 2 and fixed gate 1. Gate 1 is affixed to base 3 and cannot move independently of 3. Guide rails 4 and 5 constrain the movement of sliding gate 2.

Figure 2A:
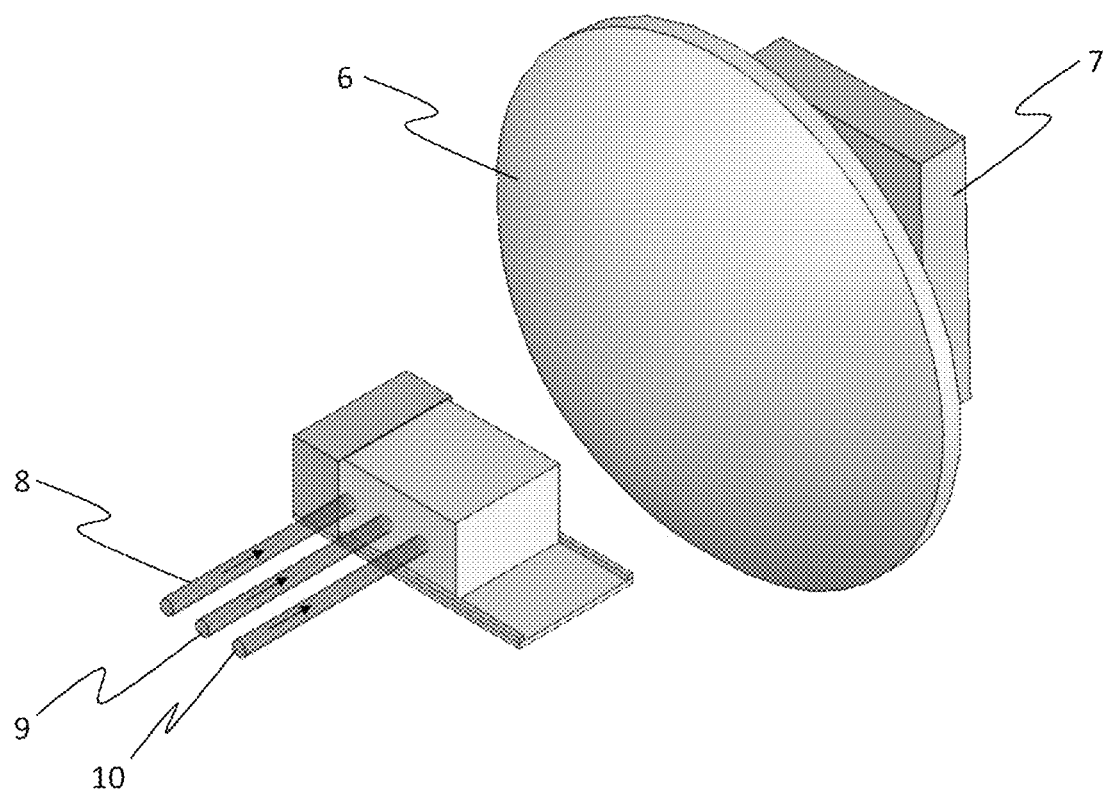
FIGS. 2A through 2C show an arrangement consisting of the moveable variable-aperture apparatus in various states of closure or opening, placed in front of a lens and detector, and being illuminated with a bundle of three parallel beams of light, which are coherent and frequency-modulated.

FIG. 2A shows converging lens 6, which focuses all parallel beams falling upon it to a single spot-on detector 7. Detector 7 is able to measure and report the resultant intensity of the combined beams directed onto it, as well as the beat frequency of the combination of beams. FIG. 2A shows the moveable variable-aperture apparatus closed, so that it admits no light.

The widths of the parallel coherent beams 8, 9 and 10 will be known from the optical system that produced them, but generally their separations are not necessarily known. For example, the beam separations could be unknown if beams 8, 9 and 10 resulted from multiple refractions and reflections of an original beam that was incident on a dielectric slab. Parallel coherent beams 8, 9 and 10 are all frequency-modulated.

Figure 2B:
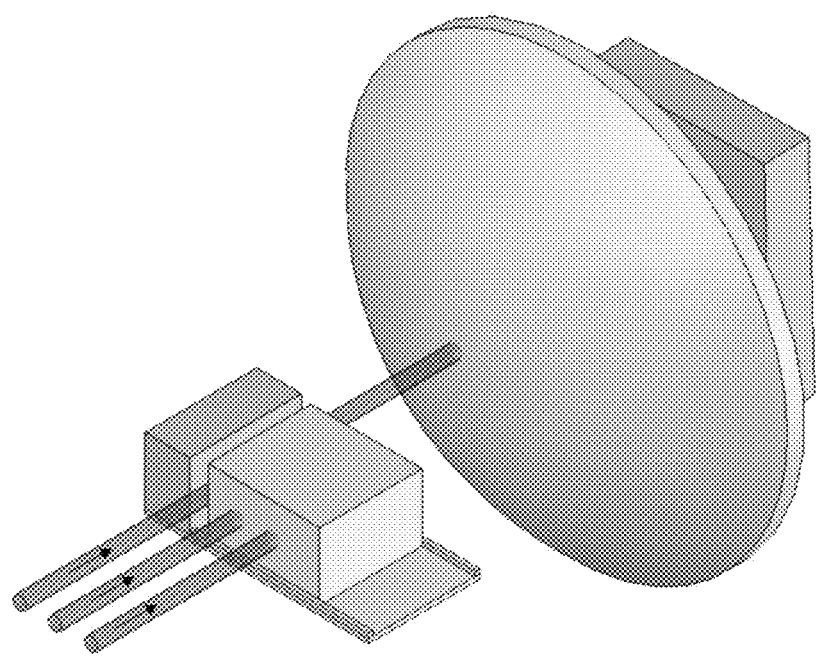
Figure 2C:
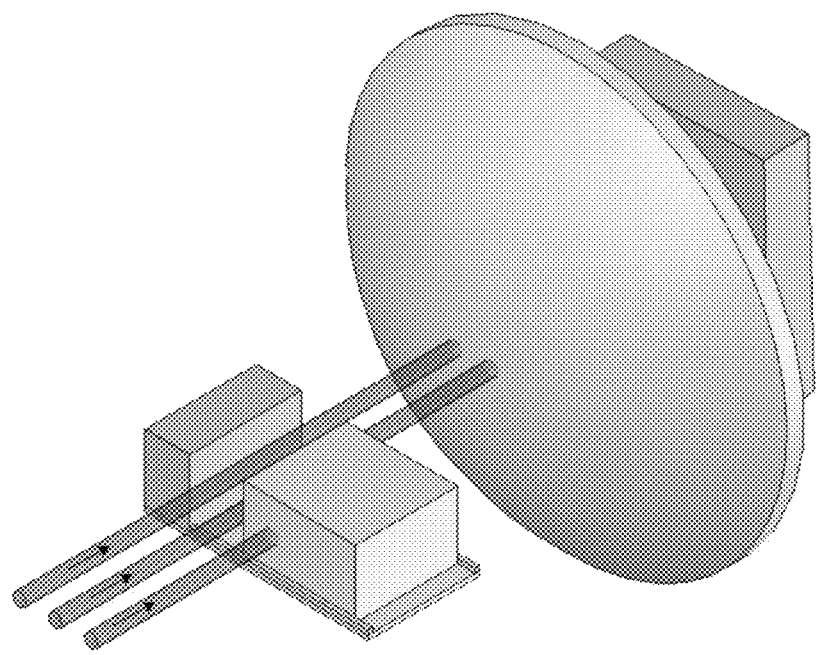

Operation—FIGS. 2B and 2C

The method of using the moveable variable-aperture apparatus and the lens and detector is as follows. The MVA apparatus is first opened so that its aperture is the known width of a single beam, then the apparatus is positioned so that the light which passes through the aperture is of maximum intensity and zero beat frequency, being a single beam (FIG. 2B). This position is called the max-intensity-no-beat position, and can be found by observing the output of detector 7, while adjusting the position of the MVA apparatus. The intensity at the max-intensity-no-beat position will be a maximum compared with all positions within half a beam's width of its location. Then the aperture is then opened to the minimum width with which the light passing through attains maximum intensity with non-zero beat frequency, being two beams (FIG. 2C). The width of the aperture at that point will be the sum of two beamwidths plus the separation between their axes. Hence the axial separation of the beams will be the difference between the aperture size and one beamwidth.

The foregoing discussions can be summarised with the following algorithm.

(1) Pre-set the aperture apparatus to the known width of a single beam.
(2) Perform a search-and-overshoot procedure with the fixed gate:
  i. Move the entire aperture apparatus so as to intercept one beam. It will be a location where no-beat maximum power is detected.
  ii. Overshoot the position of maximum power, while sampling the power-vs-position relationship.
  iii. Record the position of maximum power.
(3) Fix the aperture apparatus at the position of maximum power from step (2) iii. If an automatic control system or servo positioning system is used, the location in (2) iii can be used as a reference or target position for fixing the aperture apparatus.
(4) Perform a search-and-overshoot procedure with the sliding gate:
  i. Move the sliding gate (open the aperture apparatus) until it first admits a second beam. It will be the minimum aperture width at which maximum beat signal amplitude is detected.
  ii. Overshoot the position of maximum beat signal, while sampling the amplitude-vs-position relationship.
  iii. Record and save the earliest position of maximum beat signal. Note that this position of the sliding gate gives the size of the aperture. The recorded value can also be used as a reference (target value) for an aperture-size control system.
(5) Compute the beam separation as the difference between the aperture size and one beamwidth. Alternatively, compute the envelope-to-envelope separation between the beams as the difference between the aperture size and two beamwidths.

Additional Embodiments

Additional embodiments of the aperture apparatus and its accessories are possible. For instance, the converging lens 6 can be replaced by a converging mirror, with the detector 7 placed in front of the mirror rather than behind it.

Advantages

From the foregoing description, a number of advantages of my method become evident:

(a) Any slab of dielectric material illuminated by a single beam of coherent laser light will typically produce multiple derivative beams as a result of repeated reflection and refraction as the light propagates through the layer and leaks from the layer. In a non-controlled, non-laboratory setting, it is necessary, for various purposes, to accurately measure the separation between adjacent derivative beams. However, multiple beams entering a lens and detector make it difficult to determine the beam separation, and can produce ambiguous results. Having only two beams enter the lens and detector makes this separation-measurement straightforward, and produces unambiguous results. The novel method described here selects and admits only two beams from a bundle of multiple parallel beams.
(b) The method produces a measurement of the separation between the selected beams' axes.
(c) The method produces a measurement of the separation between the selected beams' outer envelopes.

REFERENCES

The main reference for this invention is

[1] Richard Fauconier, "Feedback control method for limiting interfering Gaussian beams in a bistatic substance-on-surface chemical recognizer", SPIE Security and Defence 2019 Proceedings, Volume 11159, Electro-Optical and Infrared Systems: Technology and Applications XVI, 111590T, Strasbourg, France, 9 Oct. 2019.

Conclusion, Ramifications and Scope

Accordingly, the reader will see that the method described can easily select any chosen dyad of parallel beams from a multitude of frequency-modulated parallel beams and measure their separation in two ways.

This method is able to do its stated tasks in an uncontrolled, non-laboratory setting. This precise ability is crucial to measuring refractive index and thickness of dielectric films in the field. In turn, the field measurement of refractive index and film thickness are critical to the unambiguous identification of substances on surfaces by their diffuse infrared reflectance spectra.

Although the description above contains many specificities, these should not be construed as limiting the scope of the embodiments but as merely providing illustrations of some of several embodiments. For example, the converging lens can be replaced by a converging mirror, and the detector placed off-axis in front of the mirror rather than on-axis behind the lens. The scope of the embodiments should be determined by the appended claims and their legal equivalents, rather than by the examples given.

I claim:

1. A method of using a moveable, variable-aperture apparatus in conjunction with a lens and a detector, to admit only two beams from a bundle of multiple parallel beams of frequency-modulated coherent light, comprising:
pre-setting said moveable, variable-aperture apparatus's aperture to a known width of a single beam of the bundle of multiple parallel beams,
positioning said moveable, variable-aperture apparatus until the light which passes through the variable aperture apparatus's aperture is of maximum intensity and zero beat frequency,
leaving said moveable, variable-aperture apparatus in place but opening the aperture to the minimum width with which the light passing through the variable aperture apparatus's aperture attains maximum intensity with non-zero beat frequency, thereby admitting only two light beams from the bundle.

2. A method of using a moveable, variable-aperture apparatus to measure the separation between two parallel beams of light, comprising the method described in claim 1, and then
  measuring q, the width of the aperture upon completion of the method in claim 1
  subtracting w, the known beamwidth, from q, the aperture width, to obtain s, the separation of the beams' central axes, using the equation s=q−w.

3. A method of using a moveable, variable-aperture apparatus to measure an alternative separation between two parallel beams of light, comprising the method described in claim 1, and then
  measuring q, the width of the aperture upon completion of the method in claim 1
  subtracting twice the known beamwidth w from the aperture width q, to obtain u, the separation of the beams' outer envelopes, using the equation u=q−2w.

\* \* \* \* \*